(12) United States Patent
Sidhu et al.

(10) Patent No.: US 12,143,897 B2
(45) Date of Patent: Nov. 12, 2024

(54) METHOD AND ELECTRONIC DEVICE FOR SMART HOME CONTROL

(71) Applicant: Samsung Electronics Co., Ltd., Suwon-si (KR)

(72) Inventors: Gurmanjeet Singh Sidhu, Noida (IN); Mohith Chigullapally, Noida (IN); Vishal Sharma, Noida (IN); Nikhil Chugh, Noida (IN); Anand Kumar Asati, Noida (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 327 days.

(21) Appl. No.: 17/741,978

(22) Filed: May 11, 2022

(65) Prior Publication Data

US 2023/0232184 A1 Jul. 20, 2023

Related U.S. Application Data

(63) Continuation of application No. PCT/KR2022/005908, filed on Apr. 26, 2022.

(30) Foreign Application Priority Data

Jan. 18, 2022 (IN) .............................. 202241002830

(51) Int. Cl.
*H04W 4/029* (2018.01)
*G01S 5/02* (2010.01)
(Continued)

(52) U.S. Cl.
CPC ........... *H04W 4/029* (2018.02); *G01S 5/0269* (2020.05); *G01S 5/0284* (2013.01);
(Continued)

(58) Field of Classification Search
CPC ..... H04W 4/029; G01S 5/0269; G01S 5/0284
See application file for complete search history.

(56) References Cited

U.S. PATENT DOCUMENTS 8,694,275 B2 4/2014 Wang et al.
10,383,497 B2 8/2019 Han et al.
(Continued)

FOREIGN PATENT DOCUMENTS

EP 3360309 B1 7/2019
KR 10-2016-0011419 A 2/2016
(Continued)

OTHER PUBLICATIONS https://www.slashgear.com/samsung galaxy-smarttag-expands-with-uwb-tracking-14655211.
(Continued)

*Primary Examiner* — Kevin Kim
(74) *Attorney, Agent, or Firm* — Jefferson IP Law, LLP (57) ABSTRACT

A method for remote control of at least one non-ultra wide band (nUWB) device in a space by an electronic device is provided. The method includes identifying a position using at least one ultra wideband (UWB) anchor in the space, determining a field of view based on the position of the electronic device in the space, identifying the at least one nUWB device within the field of view, and establishing communication with the at least one nUWB device.

18 Claims, 8 Drawing Sheets

(51) Int. Cl.
 *G01S 13/02* (2006.01)
 *H04W 4/80* (2018.01)
 *G16Y 30/00* (2020.01)
(52) U.S. Cl.
 CPC ........... *G01S 13/0209* (2013.01); *H04W 4/80* (2018.02); *G16Y 30/00* (2020.01)

(56) References Cited

U.S. PATENT DOCUMENTS

| | | | |
|---|---|---|---|
| 10,872,213 | B2 | 12/2020 | Mountz |
| 11,234,040 | B1* | 1/2022 | Nijim .................. H04N 21/251 |
| 2005/0225453 | A1 | 10/2005 | Chang et al. |
| 2015/0326704 | A1 | 11/2015 | Ko et al. |
| 2020/0064456 | A1 | 2/2020 | Xu et al. |
| 2020/0228943 | A1 | 7/2020 | Martin et al. |
| 2020/0326837 | A1 | 10/2020 | Ni |
| 2021/0084571 | A1 | 3/2021 | Park et al. |
| 2022/0405317 | A1* | 12/2022 | Marks .................. G06V 20/20 |

FOREIGN PATENT DOCUMENTS

| | | |
|---|---|---|
| KR | 10-2328673 B1 | 11/2021 |
| WO | 2016/191875 A1 | 12/2016 |
| WO | 2020/049527 A1 | 3/2020 |

OTHER PUBLICATIONS https://www.youtube.com/watch?,v=TD_BZN0bn_U&ab_channel=Samsung.
https://www.youtube.com/watch?v=,DGBxL3Ndhww&ab_channel=Xiaomi.
International Search Report and written opinion dated Oct. 4, 2022, issued in International Application No. PCT/KR2022/005908.
Indian Office Action dated Aug. 26, 2024, issued in Indian Application No. 202241002830.

* cited by examiner

METHOD AND ELECTRONIC DEVICE FOR SMART HOME CONTROL

CROSS-REFERENCE TO RELATED APPLICATION(S)

This application is a continuation application, claiming priority under § 365(c), of an International application No. PCT/KR2022/005908, filed on Apr. 26, 2022, which is based on and claims the benefit of an Indian patent application number 202241002830, filed on Jan. 18, 2022, in the Indian Patent Office, the disclosure of which is incorporated by reference herein in its entirety.

TECHNICAL FIELD

The disclosure relates to Internet of Things devices using ultra wide band. More particularly, the disclosure relates to a method and an electronic device for remote control of non-ultra wide band (nUWB) devices in a space.

BACKGROUND ART

Ultra wide band (UWB) is a radio technology that uses a low energy band for short range high bandwidth communications for a wide radio spectrum. It is especially used for precise location services and tracking applications. UWB uses very narrow time duration pulses with very large instantaneous bandwidth which helps to make it immune to multiple radio transmissions. Since this is removed distance between two communicating devices (a target device and a source device) via UWB is obtained based on a time difference of arrival. By using multiple radio frequency receivers, an angle of arrival of a target device is determined thereby providing a precise direction in which the target device is located. Coupled with the distance determined, the location of the target device can be ascertained.

However, this process of using UWB is restricted to devices with UWB chips and ultimately is non-compatible with non-UWB (nUWB) devices. In most internet of things (IoT) solutions, legacy devices are devoid of UWB chips. A separate UWB anchor device can be used to onboard nUWB devices to be controlled by UWB devices. This is done by onboarding nUWB devices to the UWB anchor via other means of communication and controlling the nUWB devices using a UWB device tethered to the UWB anchor via UWB. However, this can be a highly complicated and cumbersome process in first onboarding each of the nUWB devices and then ensuring time exhaustive device management policies in managing the various IoT devices to be controlled.

There remains a need for more efficient methods to optimize the remote control of IoT devices in a space.

The above information is presented as background information only to assist with an understanding of the disclosure. No determination has been made, and no assertion is made, as to whether any of the above might be applicable as prior art with regard to the disclosure.

DISCLOSURE

Technical Problem

Aspects of the disclosure are to address at least the above-mentioned problems and/or disadvantages and to provide at least the advantages described below. Accordingly, an aspect of the disclosure is to provide a method of remote control of non-ultra wide band (nUWB) devices in a space using an electronic device.

Another aspect of the disclosure is to generate a field of view based on a position of the electronic device.

Another aspect of the disclosure is to identify nUWB devices within the field of view.

Another aspect of the disclosure is to establish communication with the nUWB devices.

Additional aspects will be set forth in part in the description which follows and, in part, will be apparent from the description, or may be learned by practice of the presented embodiments.

Technical Solution

In accordance with an aspect of the disclosure, a method for remote control of at least one non-ultra wide band (nUWB) device in a space by an electronic device is provided. The method includes identifying a position of the electronic device using at least one ultra wideband (UWB) anchor in the space, determining a field of view based on the position of the electronic device in the space, identifying the at least one nUWB device within the field of view, and establishing communication with the at least one nUWB device.

In accordance with another aspect of the disclosure, an electronic device for remote control of at least one non-ultra wide band (nUWB) device in a space is provided. The electronic device comprises, a memory, a transceiver, an ultra wideband (UWB) sensor, and at least one processor coupled to the memory, the transceiver, and the UWB sensor. The at least one processor is configured to identify, through the UWB sensor, a position of the electronic device in the space using at least one UWB anchor in the space, determine a field of view based on the position of the electronic device in the space and storing the field of view in the memory, identify the at least one nUWB device within the field of view, and establish communication with the identified at least one nUWB device.

Other aspects, advantages and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surface.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Referring now to the drawings, and more particularly to FIGS. 1A, 1B, 3A to 3C, and 4, where similar reference characters denote corresponding features consistently throughout the figures, there are shown preferred embodiments.

Accordingly, embodiments herein disclose a method for remote control of at least one non-ultra wide band (nUWB) device (200A-200N) in a space using an electronic device (100). The method includes identifying, by the electronic device (100), a position using at least one ultra wideband (UWB) anchor (120) in the space, determining, by the electronic device (100), a field of view (FoV) based on the position of the electronic device (100) in the space, identifying, by the electronic device (100), the at least one nUWB device (200A-200N) within the field of view, and establishing communication, by the electronic device (100), with the at least one nUWB device (200A-200N).

In an embodiment, wherein identifying a position using at least one UWB anchor (120) in the space, the method comprising detecting, by the electronic device (100), at least one UWB anchor in the space upon pointing the electronic device (100) toward the at least one UWB anchor; obtaining, by the electronic device (100), magnetic data pertaining to direction; determining, by the electronic device (100), magnetic orientation of the at least one UWB anchor; receiving, by the electronic device (100), positional coordinates of the electronic device (100) with respect to the at least one UWB anchor; and identifying, by the electronic device (100), the position of the electronic device in the space based on the received positional coordinates and the magnetic orientation of the at least one UWB anchor (120) by transforming the global coordinates of the electronic device (100) to local tangent plane coordinates in the space.

In an embodiment, wherein the field of view is determined based on the position of the electronic device (100) in the space, the method comprising identifying, by the electronic device (100), an orientation of the electronic device using magnetic sensors upon pointing the electronic device (100) toward at least one of the nUWB devices (200A-200N); obtaining, by the electronic device (100), magnetic azimuth and pitch based on the identified orientation; and generating, by the electronic device (100), a field of view in the form of a frustum bound by a range of angular coordinates, wherein the range of angular coordinates are obtained by adding and subtracting a bias to the obtained magnetic azimuth and pitch.

In an embodiment, wherein the at least one nUWB device (200A-200N) in the space is onboarded with the at least one UWB anchor, the onboarding comprising obtaining position coordinates of the at least one nUWB device (200A-200N) in the space.

In an embodiment, wherein identifying the at least one nUWB device (200A-200N) within the field of view comprises receiving, by the electronic device (100), information pertaining to the at least one nUWB device (200A-200N) present in the field of view; determining, by the electronic device (100), a device vector with the electronic device (100) as a starting point and the at least one nUWB device (200A-200N) as the ending point; estimating, by the electronic device (100), a distance between the electronic device (100) and the at least one nUWB device (200A-200N) based on a dot product of the device vector with a normal of the frustum plane in the field of view; estimating, by the electronic device (100), an azimuth angle between the device vector and the normal of the frustum plane in the field of view; sorting, by the electronic device (100), the at least one nUWB device in accordance with estimated distance and azimuth angle; and displaying by the electronic device (100), the identified at least one nUWB device.

In an embodiment, wherein establishing communication with the at least one nUWB device (200A-200N) comprises determining, by the electronic device (100), a control mechanism of the identified at least one nUWB device (20A-200N); and establishing, by the electronic device (100), connection based on the control mechanism, wherein the control mechanism is based on at least one of Bluetooth or Wi-Fi.

Figure 1A:
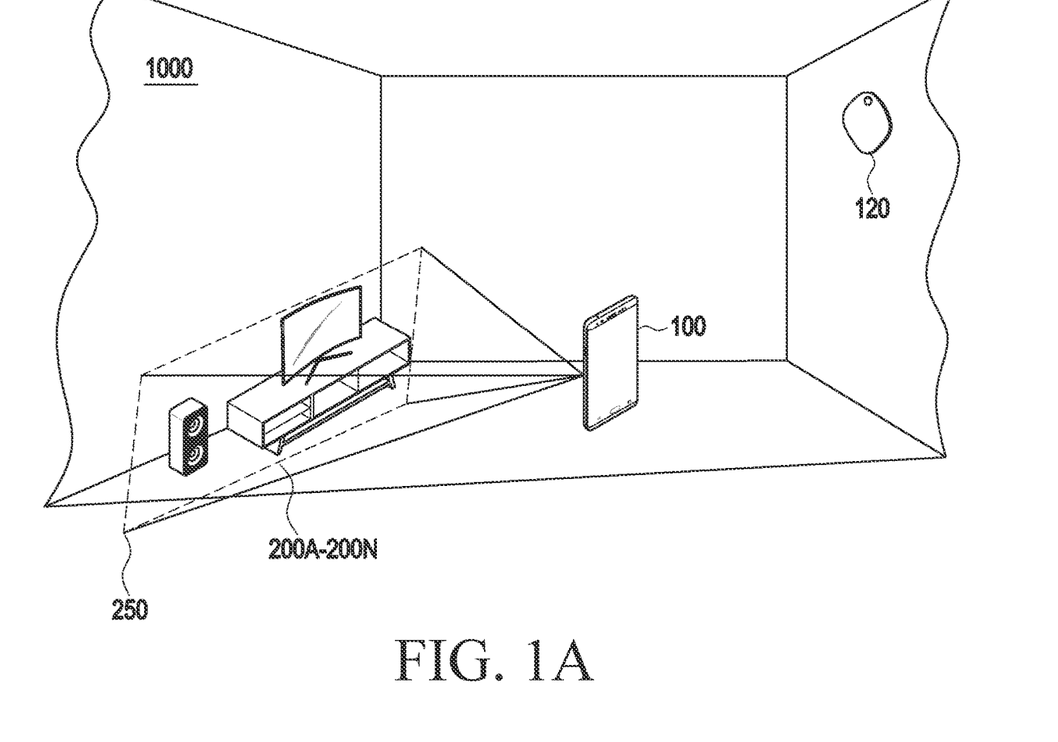
FIG. 1A illustrates a space with an Internet of Things (IoT) environment, according to an embodiment of the disclosure.

FIG. 1A illustrates a space with an Internet of Things (IoT) environment, according to an embodiment of the disclosure.

Referring to FIG. 1A, in a space (1000), an electronic device (100) controls a plurality of nUWB devices or IoT devices (200A-200N). The space (1000) may be enclosed. On Device Initialize, the electronic device 100 detects and collects ranging information from available UWB anchors (120) in the space (1000). That helps to identify the coordinates of the electronic device (100) in the space (1000). Magnetic data is sought and stored on the electronic device (100) from a magnetic sensor on the electronic device which is in turn shared with the UWB anchor (120). Using the electronic device location and the magnetic sensor data a field of view (250) is generated wherever the electronic device (100) is pointed as illustrated. Within the field of view (250), if any of the IoT devices (200A-200N) are located, they are detected and accordingly controlled by the electronic device (100).

Figure 1B:
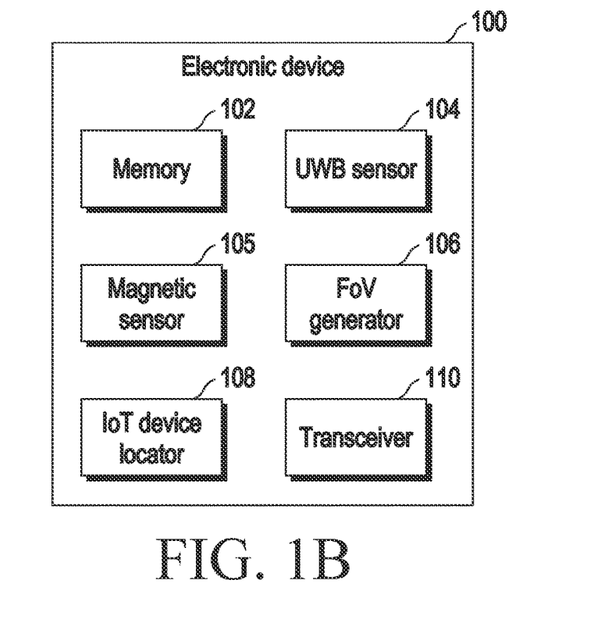
FIG. 1B is a block diagram of an electronic device for remote control of non-ultra wideband (nUWB) devices, according to an embodiment of the disclosure.

FIG. 1B is a block diagram of an electronic device for remote control of nUWB devices, according to an embodiment of the disclosure.

Referring to FIG. 1B, the electronic device (100) includes a memory (102), a UWB sensor (104) communicably coupled to the memory configured to identifying a position using at least one ultra wideband (UWB) anchor (120) in the space, a field of view (FoV) generator (106) communicably coupled to the UWB sensor (104) configured to determine a field of view based on the position of the electronic device (100) in the space and storing the field of view in the memory (102), an IoT device locator (108) communicably coupled to the field of view generator (106) configured to identify the at least one nUWB device (200A-200N) within the field of view; and a transceiver (110) configured to establish communication with the at least one nUWB device (200A-200N). The FoV generator (106) and the IoT device locator (108) may be implemented through at least one processor. A magnetic sensor (105) is also present on the electronic device (100) that is configured to determine the magnetic orientation of the at least one UWB anchor.

Figure 2:
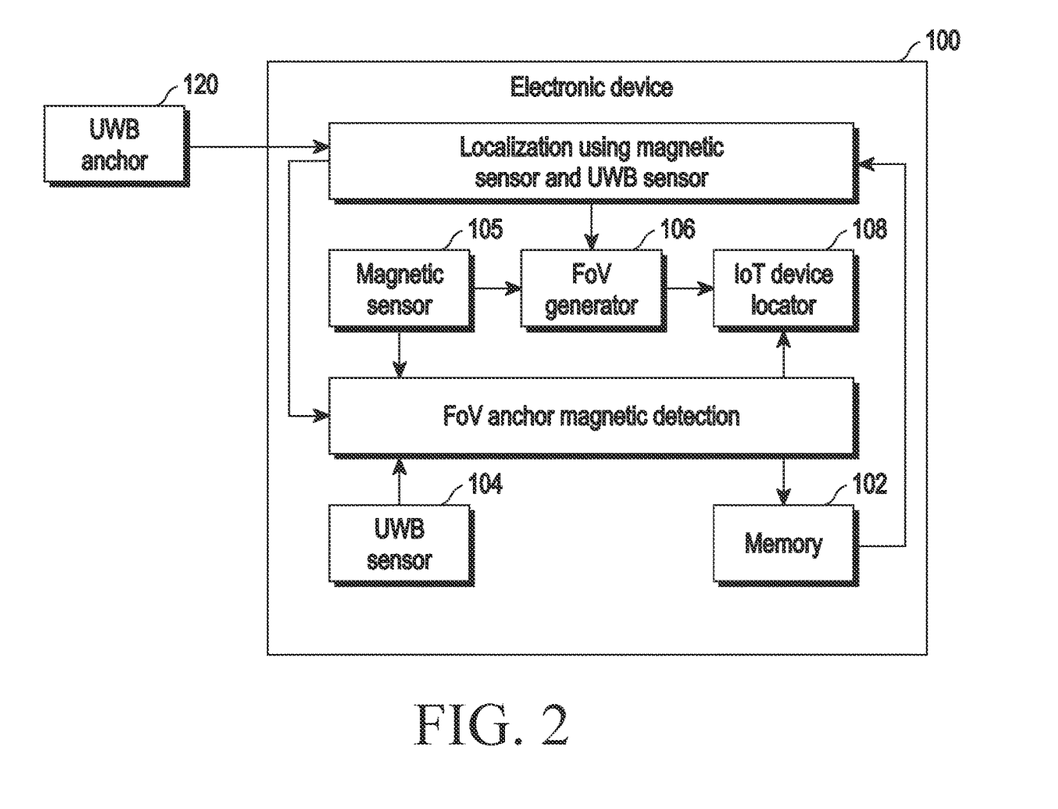
FIG. 2 is a flow diagram illustrating interaction between the various components of the electronic device illustrated in FIG. 1B, according to an embodiment of the disclosure.

FIG. 2 is a flow diagram illustrating interaction between the various components of the electronic device illustrated in FIG. 1B, according to an embodiment of the disclosure.

Referring to FIG. 2, the UWB anchor (120) is a UWB or Bluetooth capable device used as an anchor for tanging the electronic device (100) when it is in the vicinity. The location of the electronic device (100) is determined with respect to the UWB anchor (120) by, identifying a position using at least one UWB anchor (120) in the space, the method comprising detecting, by the UWB sensor (104), at least one UWB anchor in the space upon pointing the electronic device (100) toward the at least one UWB anchor; obtaining magnetic data pertaining to direction; receiving and storing positional coordinates of the electronic device (100) with respect to the at least one UWB anchor in the memory (102); determining, by a magnetic sensor (105), magnetic orientation of the at least one UWB anchor, wherein the magnetic sensor (105) is communicably coupled to the UWB sensor (104); storing the magnetic orientation of the at least one UWB anchor in the memory (102); and transforming positional coordinates to global coordinates using the stored magnetic orientation of the at least one UWB anchor; identifying the position of the electronic device in the space based on the global coordinates. The field of view is determined using the field of view generator (106) based on the position of the electronic device (100) in the space by, identifying an orientation of the electronic device using magnetic sensors upon pointing the electronic device (100) toward at least one of the nUWB devices (200A-200N); obtaining magnetic azimuth and pitch based on the identified orientation; and generating a field of view in the form of a frustum bound by a range of angular coordinates, wherein the range of angular coordinates are obtained by adding and subtracting a bias to the obtained magnetic azimuth and pitch. The electronic device (100) includes an IoT device locator (108) communicably coupled to the field of view generator (106) configured to identify the at least one nUWB device (200A-200N) within the field of view. All global coordinates, magnetic sensor data, are stored on the memory (102).

FIGS. 3A to 3E illustrate the process flow for remote control of the nUWB devices in the space, according to various embodiments of the disclosure.

In an embodiment, the process flow includes mapping available IoT devices in the space (1000) by the electronic device (100) and pointing the electronic device (100) toward an IoT device interest to establish a peer-to-peer communication. In an embodiment, the electronic device can displace an appropriate user interface on a display for a user to control the process flow.

Upon initializing the electronic device 100, the electronic device detects and collects ranging information from available anchors in the space (1000). This helps in identifying a user location in the space (1000). Magnetic stored data is used for ranging information. Magnetic sensor (105) is used to fetch the magnetic stored data. Using the current location of the electronic device (100), and the magnetic data, the FoV generator generates a field of view (FoV) frustum. A dot product of the orientation of the IoT devices and the FoV frustum planes, the IoT device locator (108) precisely locates the IoT devices in the field of view in the space (1000). A device of interest among the IoT devices in the field of view is detected based on the distance and difference in azimuth angles. According a peer-to-peer (P2P) communication is established between the electronic device (100)

and the device of interest, to which the electronic device (100) is pointed toward, and accordingly, is controlled by the electronic device (100).

In an embodiment, the electronic device (100) detects and collects ranging information from available anchors in the space (1000), helping with identifying user location. To ensure high accuracy, the agentic data of anchor (120) is determined only when the electronic device (100) and the anchor (120) are facing each other. The magnetic sensor (104) fetches the magnetic data of the electronic device 100. The anchor's orientation is determined with respect to the electronic device 100 using the magnetic data. The magnetic data is stored and then further used for determining the location of the electronic device (100) in the space (1000).

In another embodiment, the electronic device (100), after fetching the magnetic data stored for corresponding ranging information pertaining to the anchors in the space and then determining the user location and generating the FoV, the user can map known IoT devices in the space (1000) and store the IoT device locations in the memory (102).

Figure 3A:
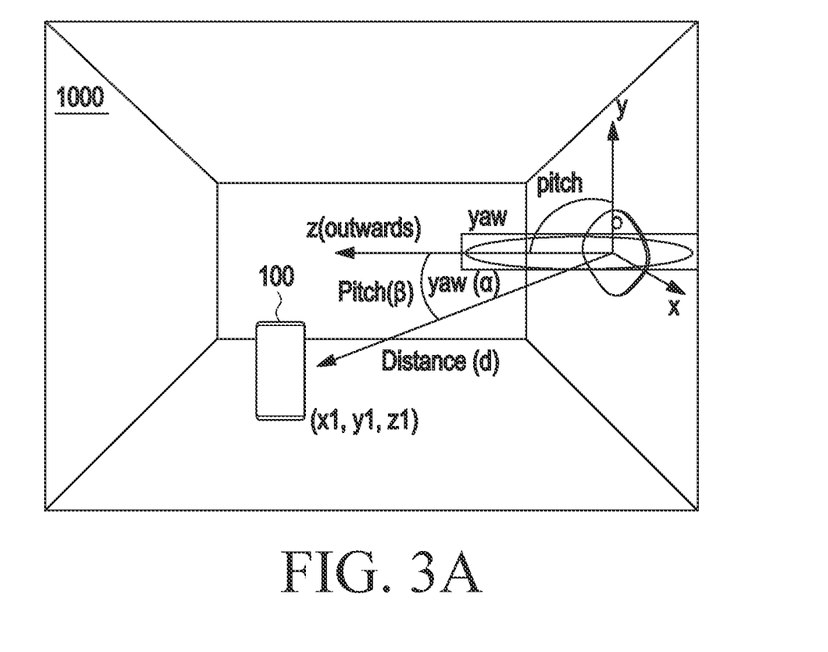
FIGS. 3A, 3B, 3C, 3D, and 3E illustrate the process flow for remote control of the nUWB devices in the space, according to various embodiments of the disclosure.

Referring to FIG. 3A, the anchor 120 determines angles of position pertaining to the electronic device 100. Angle ($\alpha$) is the yaw angle, angle ($\beta$) is the pitch. The angle ($\alpha$), the angle ($\beta$) and the distance (d) are sent to the electronic device 100. Interpretation of (x1, y1, z1) coordinates is illustrated below:

$$\text{Matrix}_{coordinates\ in\ current\ orientation} = \begin{bmatrix} d\cos\beta\sin\alpha \\ d\sin\beta \\ d\cos\beta\cos\alpha \end{bmatrix} = \begin{bmatrix} x1 \\ y1 \\ z1 \end{bmatrix} \quad \text{Equation 1}$$

The anchor (120) shares these coordinates with the electronic device (100).

Figure 3B:
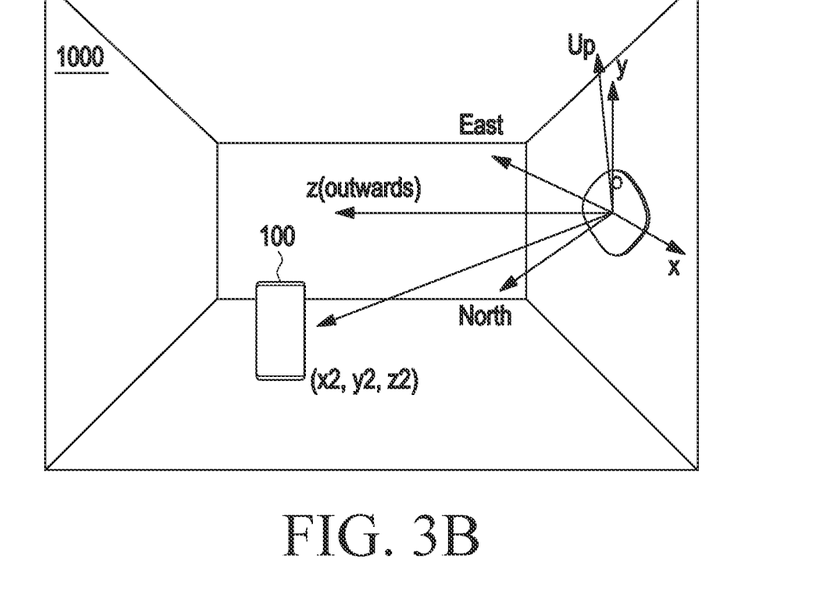

Referring to FIG. 3B, the coordinates (x1, y1, z1) are transformed from the anchor's plane into a tangent plane's coordinates (x2, y2, z2) or global coordinates of the electronic device (100) using the following dot product:

$$\text{Matrix}_{coordinatesafterSensorcorrection} = R_{sensor\ rotation\ Matrix} \cdot \text{Matrix}_{original\ coordinates} \quad \text{Equation 2}$$

Where, $R_{sensor\ rotation\ Matrix}$ is a predetermined matrix stored in the memory 102, $\text{Matrix}_{coordinates\ after\ Sensor\ correction}$ is (x2, y2, z2) and $\text{Matrix}_{originalcoordinates}$ is (x1, y1, z1).

In an embodiment the global coordinates can be determined by the following:

$$\text{Matrix}_{coordinates\ in\ Current\ Orientation} = \quad \text{Equation 3}$$
$$R_{magnetic\ rotation\ Matrix} \cdot \text{Matrix}_{coordinates\ after\ Sensor\ correction} =$$
$$R_{magnetic\ rotation\ Matrix} \cdot$$
$$(R_{sensor\ rotation\ Matrix} \cdot \text{Matrix}_{originial\ coordinates})$$

$$\text{Matrix}_{Global\ coordinates} = \quad \text{Equation 4}$$
$$R^{-1}_{magnetic\ rotation\ matrix} \cdot \text{Matrix}_{coordinates\ in\ Current\ Orientation}$$

Figure 3C:
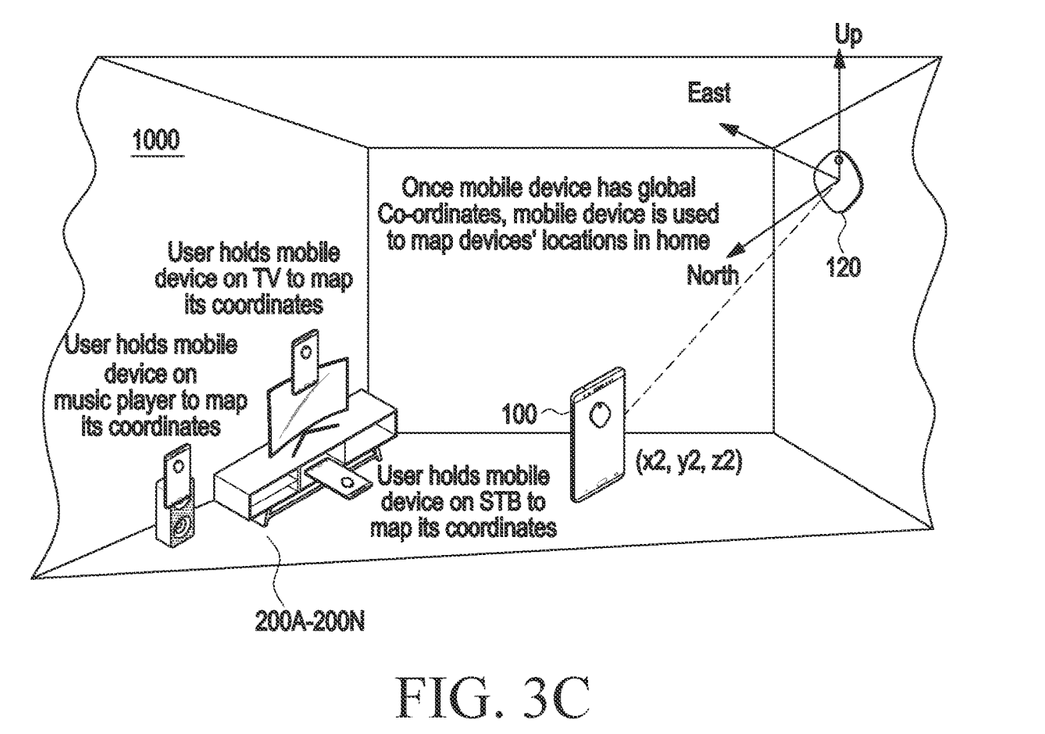

Referring to FIG. 3C, in yet another embodiment, the global coordinates (x2, y2, z2) used to map the IoT device in the space (1000). The user points the electronic device (100) to each of the IoT devices (200A-200N) in the space (1000) to register the IoT Device's coordinates in a mapping database in the memory (102). The anchor (120) coordinates are taken as the reference in a local tangent plane, with the electronic device (100) having the global coordinates (x2, y2, z2). A geo-magnetic rotation vector is determined using the UWB sensor (104). To generate the frustum, an offset is added to the azimuth and pitch respectively and a preset distance is used to generate the plane of the frustum in the space (1000) with reference to the global coordinates. Once the mobile device (100) has global coordinates, the user may also map an IoT device location in the home by holding the mobile device (100) to an IoT device such as a music player, television, set top box (STB), etc. to map the IoT device's coordinates.

Figure 3D:
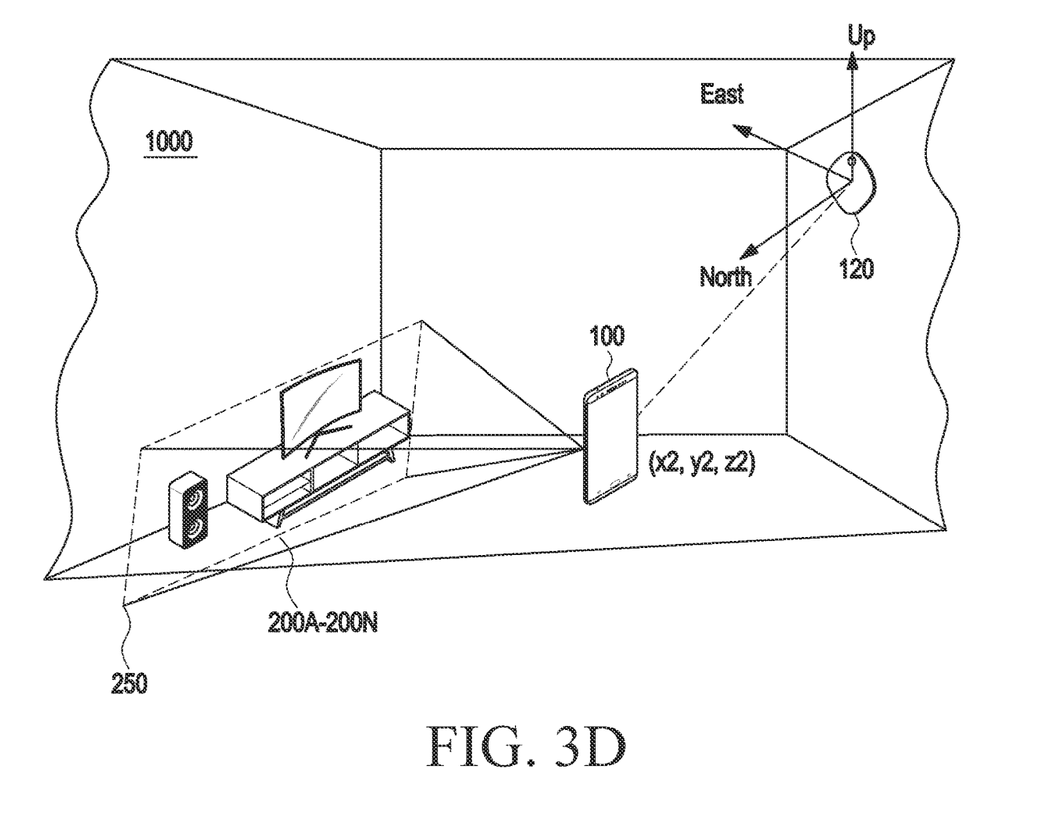

Referring to FIG. 3D, upon fetching all mapped IoT devices (200A-200N) from the anchor (120) and taking the dot product of the IoT device vector with each frustum plane normal, the IoT device locator (108) determines that the IoT device (200A-200N) in front of the electronic device (100).

IoT devices (200A-200n) are sorted based on distance and difference in angle between normal from a far plane and the IoT deice vector.

From the mapped devices, the control mechanism of a device of interest is identified. The transceiver (110) established communication with the device of interest. The mode of communication is, but not limited to, Bluetooth, or Wi-Fi.

Figure 3E:
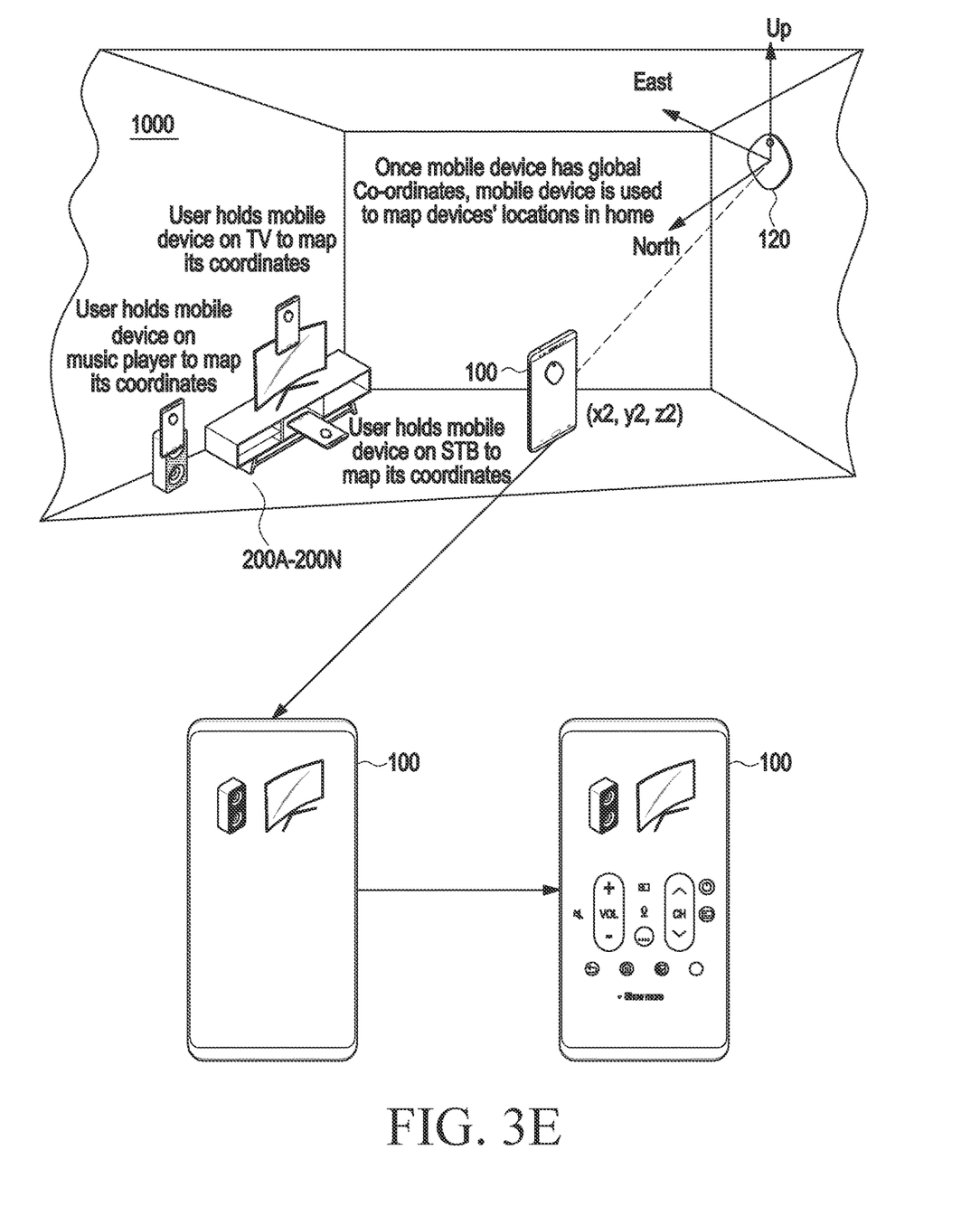

Referring to FIG. 3E, the appropriate user interface pertaining to the control mechanism of the device of interest is then displayed to the user via the electronic device 100.

Figure 4:
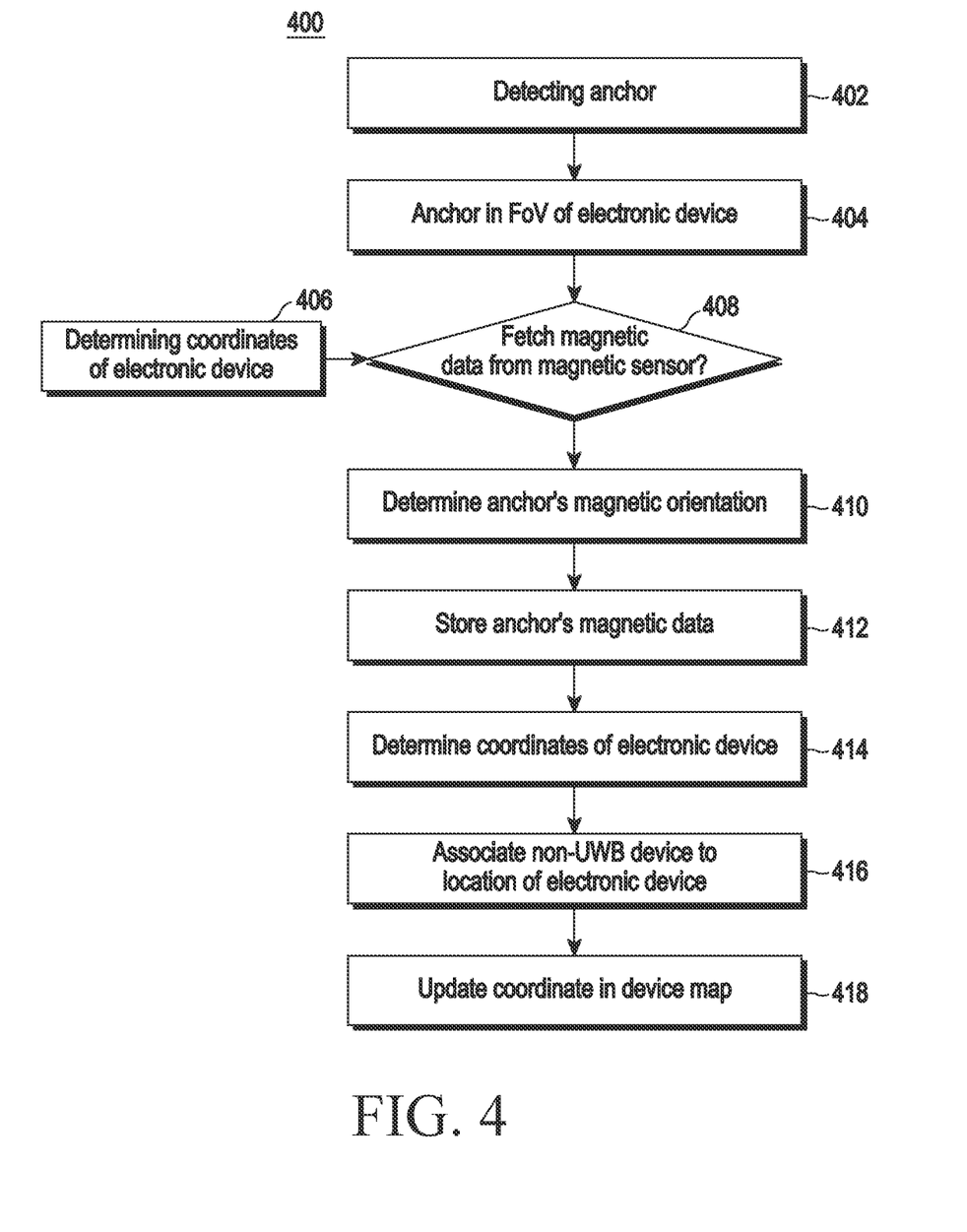
FIGS. 4 and 5 are flow diagrams illustrating a sequence of operations for remote control with respect to the electronic device (100) and the nUWB devices illustrated in FIGS. 1A and 1B, according to various embodiments of the disclosure.
Figure 5:
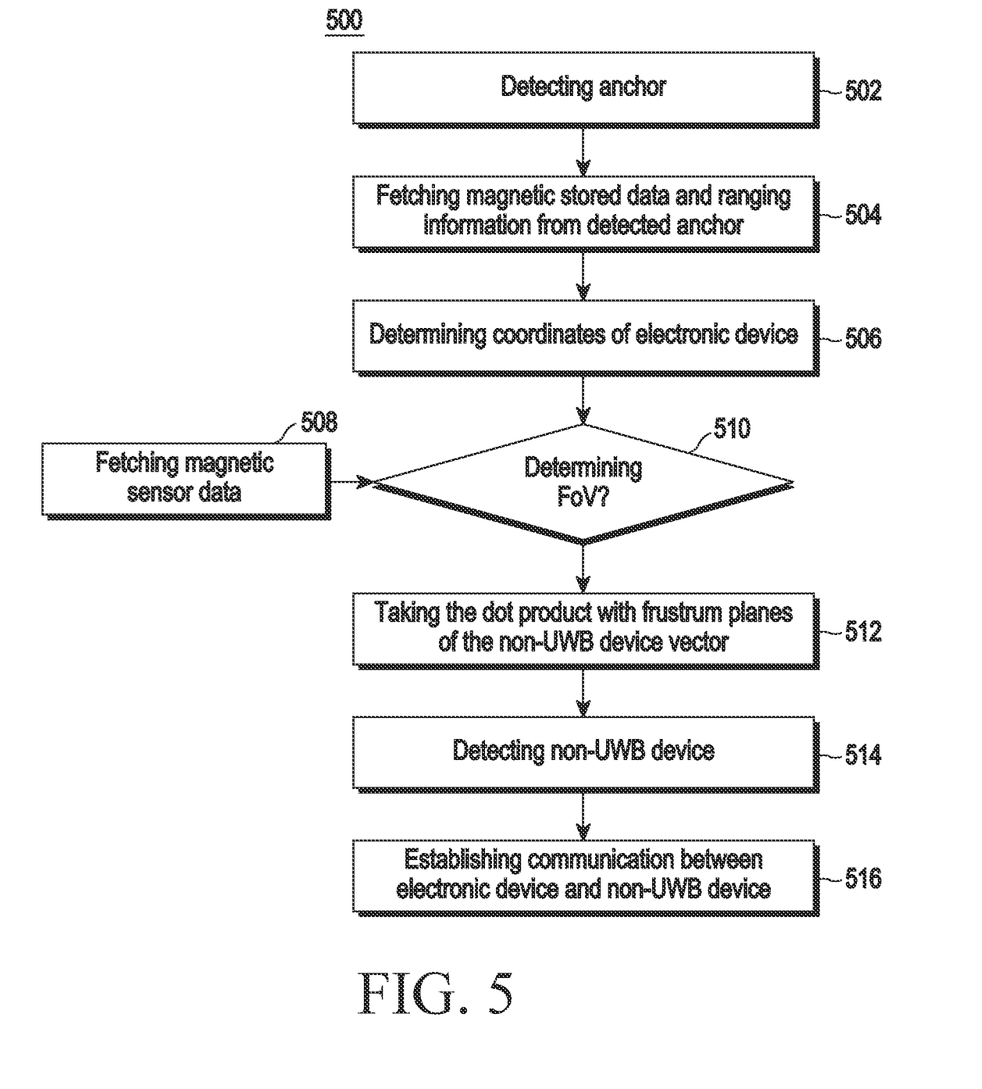

FIGS. 4 and 5 are flow diagrams illustrating a sequence of operations for remote control with respect to the electronic device (100) and the nUWB devices illustrated in FIGS. 1A and 1B, according to various embodiments of the disclosure.

Referring to the flow diagram 400 of FIG. 4, the UWB anchor (120) is a UWB or Bluetooth capable device used as an anchor for tanging the electronic device (100) when it is in the vicinity. At operations 402, 404 and 408, the location of the electronic device (100) is determined with respect to the UWB anchor (120) by, identifying a position using at least one UWB anchor (120) in the space, the method comprising detecting, by the UWB sensor (104), at least one UWB anchor in the space upon pointing the electronic device (100) toward the at least one UWB anchor. The at least one UWB anchor is detected in operation 402. The electronic device (100) determines that the anchor is in the FoV at operation 404. Coordinates of the electronic device (100) are determined in operation 406. At operation 408, magnetic data pertaining to direction is obtained, and positional coordinates of the electronic device (100) with respect to the at least one UWB anchor in the memory (102) are received and stored. The magnetic sensor (105) determines magnetic orientation of the at least one UWB anchor in operation 410, wherein the magnetic sensor (105) is communicably coupled to the UWB sensor (104), stores the magnetic orientation of the at least one UWB anchor in the memory (102) at operation 412; and transforms positional coordinates to global coordinates using the stored magnetic orientation of the at least one UWB anchor at operation 414. The position of the electronic device in the space is identified based on the global coordinates. An nUWB device or IoT device (200A-200N) is associated with the position of the electronic device (100) at operation 416 and coordinates of the nUWB device are updated in the device map stored in the memory (102) in operation 418.

Referring to the flow diagram 500 of FIG. 5, the field of view is determined at operations 502-510, using the field of view generator (106) based on the position of the electronic device (100) in the space (1000). The at least one UWB anchor is detected in operation 502. The electronic device (100) fetches magnetic stored data and ranging information from the detected anchor at operation 504. Coordinates of the electronic device (100) are determined in operation 506. The electronic device (100) fetches magnetic sensor data in operation 508. A field of view of the electronic device (100) is determined in operation 510. Identifying an orientation of the electronic device using magnetic sensors is performed upon pointing the electronic device (100) toward at least one of the nUWB devices (200A-200N). Magnetic azimuth and pitch based on the identified orientation is obtained and a field of view is generated in the form of a frustum bound by a range of angular coordinates, wherein the range of angular coordinates are obtained by adding and subtracting a bias or offset to the obtained magnetic azimuth and pitch at operations 510-512. This includes determining the dot product with frustum planes of the IoT device vector in operation 512. The electronic device (100) includes an IoT device locator (108) communicably coupled to the field of view generator (106) configured to identify the at least one nUWB device (200A-200N) within the field of view at operation 514. The electronic device (100) establishes communication with the identified at least one nUWB device in operation 516. All global coordinates, magnetic sensor data, are stored on the memory (102). Accordingly, the IoT device of interest is further communicated to using the transceiver (110) at operation 516.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by an electronic device for remote control of at least one non-ultra wide band (nUWB) device in a space, the method comprising:
   identifying, by the electronic device, a position of the electronic device in the space using at least one ultra wideband (UWB) anchor in the space based on positional coordinates of the electronic device and a magnetic orientation of the at least one UWB anchor;
   determining, by the electronic device, a field of view based on the position of the electronic device in the space;
   identifying, by the electronic device, the at least one nUWB device within the field of view; and
   establishing, by the electronic device, communication with the identified at least one nUWB device.

2. The method of claim 1, wherein the identifying of the position using at least one UWB anchor in the space comprises:
   detecting, by the electronic device, the at least one UWB anchor in the space in response to pointing the electronic device toward the at least one UWB anchor,
   obtaining, by the electronic device, magnetic data pertaining to direction,
   determining, by the electronic device, the magnetic orientation of the at least one UWB anchor,
   receiving, by the electronic device, the positional coordinates of the electronic device with respect to the at least one UWB anchor, and
   identifying, by the electronic device, the position of the electronic device in the space based on the received positional coordinates and the magnetic orientation of the at least one UWB anchor by transforming positional coordinates of the electronic device to local tangent plane coordinates in the space.

3. The method of claim 2, wherein the positional coordinates include pitch and yaw of the electronic device.

4. The method of claim 2, wherein the detected at least one UWB anchor is within the field of view of the electronic device.

5. The method of claim 1,
   wherein the determining of the field of view based on the position of the electronic device in the space comprises:
      identifying, by the electronic device, an orientation of the electronic device using magnetic sensors in response to pointing the electronic device toward at least one of the at least one nUWB device,
      obtaining, by the electronic device, magnetic azimuth and pitch based on the identified orientation, and
      generating, by the electronic device, a field of view in a form of a frustum bound by a range of angular coordinates, and
   wherein the range of angular coordinates are obtained by adding and subtracting a bias to the obtained magnetic azimuth and pitch.

6. The method of claim 1, wherein the at least one nUWB device in the space is onboarded with the at least one UWB anchor, the onboarding comprising obtaining position coordinates of the at least one nUWB device in the space.

7. The method of claim 6, wherein the identifying of the at least one nUWB device within the field of view comprises:
   receiving, by the electronic device, information pertaining to the at least one nUWB device present in the field of view,
   determining, by the electronic device, a device vector with the electronic device as a starting point and the at least one nUWB device as an ending point,
   estimating, by the electronic device, a distance between the electronic device and the at least one nUWB device based on a dot product of the device vector with a normal of a frustum plane in the field of view,
   estimating, by the electronic device, an azimuth angle between the device vector and the normal of the frustum plane in the field of view,
   sorting, by the electronic device, the at least one nUWB device in accordance with estimated distance and azimuth angle, and
   displaying, by the electronic device, the identified at least one nUWB device.

8. The method of claim 1,
   wherein the establishing of the communication with the at least one nUWB device comprises:
      determining, by the electronic device, a control mechanism of the identified at least one nUWB device, and
      establishing, by the electronic device, a connection based on the control mechanism, and
   wherein the control mechanism is based on at least one of Bluetooth or Wi-Fi.

9. The method of claim 1, further comprising:
   mapping, by the electronic device, coordinates of the at least one nUWB device in the space.

10. The method of claim 9, wherein mapping the coordinates of the at least one nUWB device comprises holding the electronic device in contact with the at least one nUWB device.

11. The method of claim 9, further comprising:
   mapping, by the electronic device, locations of known Internet of Things (IoT) devices in the space; and
   storing, by the electronic device, the locations of the known IoT devices in memory of the electronic device.

12. An electronic device for remote control of at least one non-ultra wide band (nUWB) device in a space, the electronic device comprising:

memory storing one or more computer programs;
a transceiver;
an ultra wideband (UWB) sensor; and
one or more processors communicatively coupled to the memory, the transceiver, and the UWB sensor,
wherein the one or more computer programs include computer-executable instructions that, when executed by the one or more processors individually or collectively, cause the electronic device to:
 identify, through the UWB sensor, a position of the electronic device in the space using at least one UWB anchor in the space based on positional coordinates of the electronic device and a magnetic orientation of the at least one UWB anchor,
 determine a field of view based on the position of the electronic device in the space,
 store the field of view in the memory,
 identify the at least one nUWB device within the field of view, and
 establish communication with the identified at least one nUWB device.

13. The electronic device of claim 12, wherein the one or more computer programs further include computer-executable instructions that, when executed by the one or more processors individually or collectively, cause the electronic device to:
 detect the at least one UWB anchor in the space in response to pointing the electronic device toward the at least one UWB anchor,
 obtain magnetic data pertaining to direction,
 receive and store the positional coordinates of the electronic device with respect to the at least one UWB anchor in the memory,
 determine the magnetic orientation of the at least one UWB anchor, wherein a magnetic sensor is communicably coupled to the UWB sensor,
 store the magnetic orientation of the at least one UWB anchor in the memory,
 transform positional coordinates to global coordinates using the stored magnetic orientation of the at least one UWB anchor, and
 identify the position of the electronic device in the space based on the global coordinates.

14. The electronic device of claim 13, wherein the positional coordinates include pitch and yaw of the electronic device.

15. The electronic device of claim 12,
wherein the one or more computer programs further include computer-executable instructions that, when executed by the one or more processors individually or collectively, cause the electronic device to:
 identify an orientation of the electronic device using magnetic sensors in response to pointing the electronic device toward at least one of the at least one nUWB device,
 obtain magnetic azimuth and pitch based on the identified orientation, and
 generate the field of view in a form of a frustum bound by a range of angular coordinates, and
wherein the range of angular coordinates is obtained by adding and subtracting a bias to the obtained magnetic azimuth and pitch.

16. The electronic device of claim 12,
wherein the at least one nUWB device in the space is onboarded with the at least one UWB anchor, and
wherein the onboarding comprises obtaining position coordinates of the at least one nUWB device in the space.

17. The electronic device of claim 16, wherein the one or more computer programs further include computer-executable instructions that, when executed by the one or more processors individually or collectively, cause the electronic device to:
 receive information pertaining to the at least one nUWB device present in the field of view,
 determine a device vector with the electronic device as a starting point and the at least one nUWB device as an ending point,
 estimate a distance between the electronic device and the at least one nUWB device based on a dot product of the device vector with a normal of a frustum plane in the field of view,
 estimate an azimuth angle between the device vector and the normal of the frustum plane in the field of view,
 sort the at least one nUWB device in accordance with estimated distance and azimuth angle, and
 display the identified at least one nUWB device.

18. The electronic device of claim 12,
wherein the one or more computer programs further include computer-executable instructions that, when executed by the one or more processors individually or collectively, cause the electronic device to:
 determine a control mechanism of the identified at least one nUWB device, and
 establish a connection based on the control mechanism, and wherein the control mechanism is based on at least one of Bluetooth or Wi-Fi.

* * * * *